US010616064B2

(12) United States Patent
Cudak et al.

(10) Patent No.: US 10,616,064 B2
(45) Date of Patent: Apr. 7, 2020

(54) SOFT RESERVATION TECHNIQUES AND SYSTEMS FOR VIRTUALIZED ENVIRONMENTS

(71) Applicant: Lenovo Enterprise Solutions (Singapore) Pte. Ltd., Singapore (SG)

(72) Inventors: Gary David Cudak, Wake Forest, NC (US); Nagananda Chumbalkar, Raleigh, NC (US); Srihari Venkata Angaluri, Raleigh, NC (US); Ajay Dholakia, Cary, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 420 days.

(21) Appl. No.: 15/087,853

(22) Filed: Mar. 31, 2016

(65) Prior Publication Data

US 2017/0289061 A1    Oct. 5, 2017

(51) Int. Cl.
*H04L 12/24* (2006.01)
*H04L 12/26* (2006.01)
*H04L 12/911* (2013.01)

(52) U.S. Cl.
CPC .......... *H04L 41/0896* (2013.01); *H04L 43/08* (2013.01); *H04L 43/16* (2013.01); *H04L 47/822* (2013.01)

(58) Field of Classification Search
CPC ..................................................... H04L 47/82
See application file for complete search history.

(56) References Cited

U.S. PATENT DOCUMENTS

| 2013/0097304 A1* | 4/2013 | Asthana | ............... | H04L 41/5025 709/224 |
| 2014/0351412 A1* | 11/2014 | Elisha | ................ | H04L 41/0806 709/224 |
| 2015/0154047 A1* | 6/2015 | Chen | ..................... | G06F 9/4856 718/103 |
| 2015/0281015 A1* | 10/2015 | Griffith | ............... | H04L 43/0817 709/224 |
| 2015/0301882 A1* | 10/2015 | Liao | ................... | G05B 19/4184 714/47.3 |

* cited by examiner

*Primary Examiner* — Nicholas P Celani
(74) *Attorney, Agent, or Firm* — Zilka-Kotab, P.C.

(57) ABSTRACT

A computer program product includes a computer readable medium having computer readable program instructions configured to cause a processor to: track resource requirements for a workload deployed to a virtual environment; monitor one or more health characteristics of one or more systems of the virtual environment; determine whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment. The one or more of the systems of the virtual environment on which the one or more soft reservations are created are preferably different systems than the system to which the workload was originally deployed. Corresponding systems and methods are also disclosed.

18 Claims, 4 Drawing Sheets

SOFT RESERVATION TECHNIQUES AND SYSTEMS FOR VIRTUALIZED ENVIRONMENTS

FIELD OF THE INVENTION

The present invention relates to configuring computer systems in a virtualized environment, and more particularly, this invention relates to improving the function of virtualized computing environments by reducing or eliminating data loss and excess compute time associated with unsuccessful failover.

BACKGROUND

Cloud computing and virtualization involves dividing and assigning components of a system to be dedicated to various workloads/images. Many of these workloads/images have a set of requirements to run, meaning a system must be able to provide those requirements for the workload to be deployed/executed. If a system cannot provide those resources, then the workload/image must wait for the appropriate resources to be freed. If a system, executing a workload, encounters an issue or failure, the workload may be evacuated to another system to continue execution.

However, especially during high usage periods, there may be very few systems which meet a set of requirements to execute a given workload. When a workload is running on a system that encounters a problem, a situation may occur in which the workload has no available alternative destination which meets the requirements for execution of the workload. As a result, data loss and/or excess compute time may occur, reducing or defeating the performance of the virtualized system with respect to the workload.

Accordingly, it would be beneficial to provide systems, methods, computer program products and the like which avoid the problems associated with manual network environment configuration controlled exclusively by the user.

SUMMARY

In one embodiment, a computer program product includes a computer readable medium having stored thereon computer readable program instructions configured to cause a processor of a computer system to: track resource requirements for a workload deployed to a virtual environment; monitor one or more health characteristics of one or more systems of the virtual environment, each system being configured to execute workloads deployed to the system; determine whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the system to which the workload was deployed.

In another embodiment a computer-implemented method includes: tracking resource requirements for a workload deployed to a virtual environment; monitoring one or more health characteristics of one or more systems of the virtual environment, each system being configured to execute workloads deployed to the system; determining whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the system to which the workload was deployed.

In yet another embodiment, a system includes a processor and logic. The logic is one or more of integrated with and executable by the processor to cause the processor to: track resource requirements for a workload deployed to a virtual environment; monitor one or more health characteristics of one or more systems of the virtual environment, each system being configured to execute workloads deployed to the system; determine whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the system to which the workload was deployed.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems and techniques configured to ensure adequate resources are reserved within a virtualized environment to accommodate failover such that the function of the virtualized environment is improved by avoiding delays and data loss associated with failure events.

In one general embodiment, a computer program product includes a computer readable medium having stored thereon computer readable program instructions configured to cause a processor of a computer system to: track resource requirements for a workload deployed to a virtual environment; monitor one or more health characteristics of one or more systems of the virtual environment, each system being configured to execute workloads deployed to the system; determine whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the system to which the workload was deployed.

In another general embodiment a computer-implemented method includes: tracking resource requirements for a workload deployed to a virtual environment; monitoring one or more health characteristics of one or more systems of the virtual environment, each system being configured to execute workloads deployed to the system; determining whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the system to which the workload was deployed.

In yet another general embodiment, a system includes a processor and logic. The logic is one or more of integrated with and executable by the processor to cause the processor to: track resource requirements for a workload deployed to a virtual environment; monitor one or more health characteristics of one or more systems of the virtual environment, each system being configured to execute workloads deployed to the system; determine whether one or more soft reservations corresponding to the workload should be created on one or more of the systems of the virtual environment; and in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the system to which the workload was deployed.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems.

One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 1:
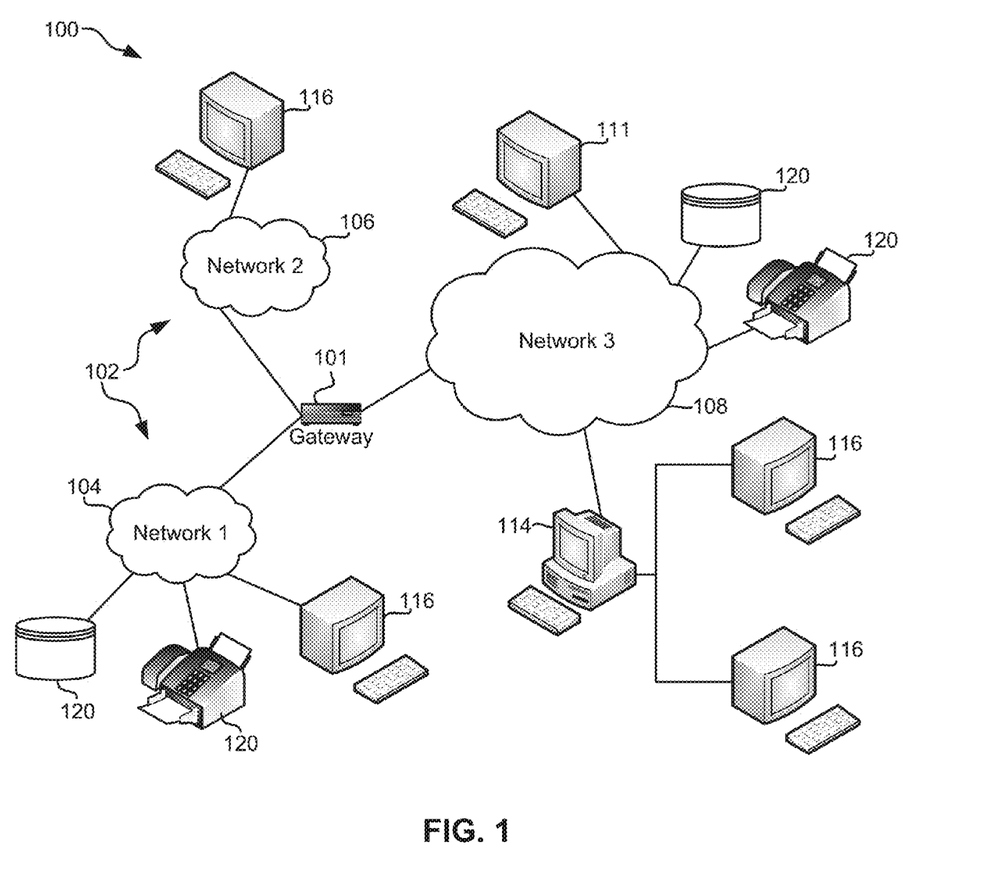
FIG. 1 is a schematic drawing of a computer network environment, according to one approach.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
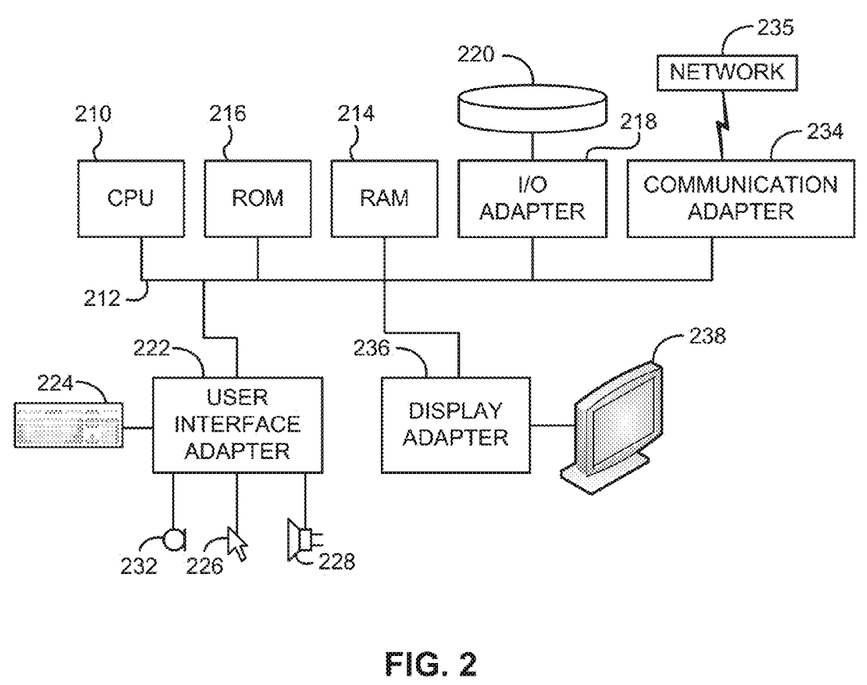
FIG. 2 depicts a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

As noted above, in conventional virtualized environments, a failure event may result in data loss or performance losses/detriments if the environment cannot accommodate a failover to compensate for the failure event. Alternatively, unnecessary migrations in anticipation of a failure event may cause performance detriments associated with migration.

For example, a workload may require 16 Gb of RAM, but the distribution of workloads at a point in time, may result in various systems only having between 4-8 Gb of RAM available. In such a situation, a workload may have no adequate destination with which to evacuate.

Conventional techniques for addressing failures in such situations either wait for a failure, an indication of a failure, or an indication of a potential failure to move a workload. In the case of immediate migration, unnecessary performance detriments may occur due to unnecessary migration when the workload would have completed.

In other approaches, the conventional system may take no action in response to the failure, failure indication, or potential failure indication. In this case of no action, there may not be a location for the workload to immediately migrate, and performance detriments occur as a result.

Figure 3:
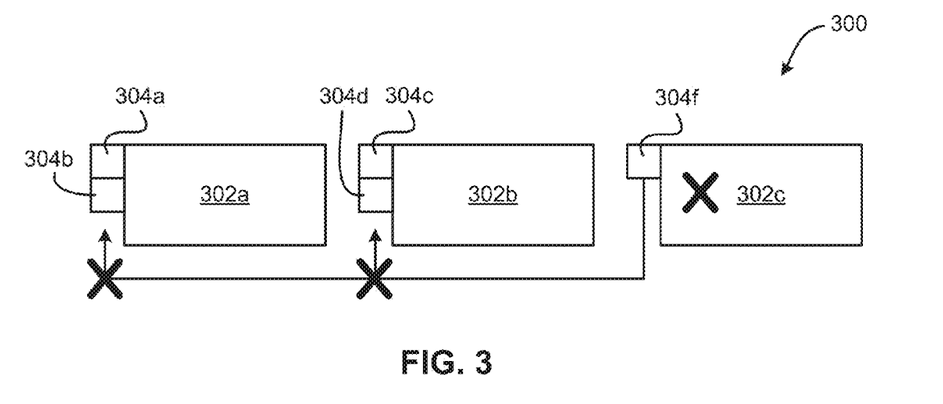
FIG. 3 depicts a conventional virtualized environment in which a failure event cannot be compensated for via failover.

For instance, and with reference to FIG. 3, a conventional virtualized environment 300 is shown. The virtualized environment includes a plurality of systems, e.g. first, second and third systems 302a, 302b, and 302c, respectively as depicted in FIG. 3. Each system, in turn, may have associated therewith one or more workloads, e.g. system 302a may be handling two workloads 304a and 304b, system 302b may also be handling two workloads 304c and 304d, and third system 302c may be handling a single workload 304f.

As will be appreciated by a person having ordinary skill in the art upon reading the present descriptions, each system is characterized by particular resources, such as memory, processor capacity/usage, storage space, etc. and/or performance characteristics, e.g. latency, network bandwidth, read/write throughput, I/O bandwidth, I/O throughput, network connectivity (e.g. number and/or type of systems, components, etc. to which the system is connected via the network), etc.

A workload, e.g. workload 304f, may similarly be characterized by particular resource or performance characteristic requirements, such as a minimum amount of memory, processor availability, storage space, I/O bandwidth, network bandwidth, etc., maximum acceptable latency, read/write throughput, etc. In the event of a failure, or a potential failure, of the system 302c handling the workload 304f, it may be advantageous to migrate the workload 304f to another system in the virtualized environment 300, e.g. system 302a or 302b.

However, if systems 302a and 302b do not meet the requirements of workload 304f, e.g. insufficient available memory, processor availability, storage space availability, I/O bandwidth, network bandwidth, etc., then it may not be possible to leverage failover and migrate the workload 304f to another system within the environment 300. In this event, performance detriments and/or data loss associated with the failure of system 302c impact the performance of the environment as a whole, which is undesirable.

Conversely, in the event of a potential failure, a conventional virtualized environment 300 may automatically, semi-automatically, or based on instructions received from a user or administrator, enforce an anticipatory migration of workload(s) 304f being handled by a system 302c with which the potential failure is associated. While these anticipatory migrations effectively avoid the delays and/or data losses associated with scenarios in which no failover is possible, any unnecessary anticipatory migration of workloads incurs a performance detriment associated with the migration, since the workload 304f could have been successfully completed on the original system 302c handling the workload 304f.

The conventional approach implements migration using a predetermined particular amount of resources on one or more systems, and holds those resources (or even entire systems) in reserve to enable failover. However, this means the reserved resources are not available for execution of workloads and the performance of the environment 300 as a whole is commensurately reduced, as a result of failure to fully utilize the processing, storage, etc. potential of the environment 300. Typically, these "hard reservations" are implemented by effectively hiding the reserved resources/systems from the environment 300 except for purposes of failover.

Accordingly, the conventional approach to failover represents an undesirable regime whereby performance detriments, data loss, etc. occur due to inability to migrate workloads from failed systems to other systems within the environment, and/or unnecessary migration of workloads that could have completed execution, processing, etc. without the migration. Hard reservation of resources to enable migrations further detriments the performance of the virtual environment.

The presently disclosed inventive concepts address these disadvantages by implementing a "soft reservation" regime to manage the reservation of resources in a dynamic manner while also allowing workloads to be deployed to resources or systems that are configured to handle failover.

In one embodiment, soft reservations may essentially involve creating one or more reservations for a particular workload (e.g. a critical workload) upon deployment and/or execution of the workload on a system. For instance, and distinct from "hard reservation" techniques, a soft reservation may involve placing a "mock" workload on one or more systems, the mock workload having resource requirements corresponding to the workload for which the reservation is created. In another approach, a soft reservation may involve modifying the apparent resources of a particular system, e.g. an apparent reduction in total system resources corresponding to resource requirements of the workload for which the reservation is created. In still more approaches, soft reservations may involve setting a threshold amount of resource utilization for a particular system or systems and ceasing deployment of new workloads to the system(s) once resource utilization on the system reaches, exceeds, or is within a particular range of the threshold utilization level.

In preferred embodiments, soft reservations may be facilitated via the use of a scaled prioritization system/technique to dynamically determine and/or modify the priority of a reservation with respect to failure indicators on a system running the workload and/or a service level agreement (SLA) associated with a particular workload.

Preferably, the reservation priority is scaled based on reviewing health characteristics for a particular system or system(s). Health characteristics may be generally considered to include any suitable measure of indicating likelihood that a system will experience a failure, particularly in the near future. For instance, and as will be understood by a skilled artisan upon reading the present descriptions, health characteristics may include read/write failures (e.g. for storage devices); I/O throughput levels (e.g. an I/O throughput below a particular threshold, benchmark, average historical throughput, etc.); read/write throughput levels; latency levels above a particular threshold; processor, memory, storage device temperature values exceeding a threshold; component voltage exceeding or falling below a particular threshold or range; fan failures or fan speed deviations from an expected speed; etc.

Health characteristics may also or alternatively include potential failure indicators, e.g. as reflected with correctable error indicators, mean time between failure statistics, predictive failure analysis, etc. as would be understood by a person having ordinary skill in the art upon reading the present descriptions.

In particularly preferred embodiments, different types of health characteristics may also be assigned different weights depending on the severity of the health characteristic with respect to a system failure. Accordingly, weights assigned on a scale from 0-1 (or any equivalent scale) may be assigned to the various health characteristics, and conditions indicating a significant likelihood of a failure within a particular timeframe (e.g. 95% likelihood of failure within 24 hours, within a particular number of operations such as read/write operations, etc.) may be assigned a high weight value (e.g. 0.5-1.0) while conditions indicating a relatively low likelihood of failure may be assigned a low weight value (e.g. 0-0.5).

In this manner, a spectrum of health characteristics may be evaluated to precisely adjust the priority of a particular reservation. Moreover, health characteristics may be monitored over time, and analyzed with respect to actual failure data, and in response to determining a particular characteristic is associated with a higher or lower likelihood of failure than reflected in the present weighting, the weight of the health characteristic may be adjusted to better reflect the actual correlation with failure events over time.

In various approaches, health conditions indicating high likelihood of failure may include temperature-based measures, especially temperature exceeding a threshold value or range; voltage-based measures, especially voltage levels outside a predetermined acceptable range for particular components; read/write failures, etc. as would be understood by a person having ordinary skill in the art upon reading the present descriptions.

In addition, health conditions indicating low likelihood of failure may include latency above a particular threshold or range, I/O throughput below a particular threshold or range, fan speed deviations from a particular threshold or range, etc. as would be understood by a person having ordinary skill in the art upon reading the present descriptions.

For instance, in one embodiment system usage information may be compared with mean time between failure data to determine the likelihood of an impending failure event, and reservation priority may be promoted or demoted based on the determined likelihood. Preferably, high failure likelihood results in promotion of reservation priority, while low failure likelihood results in demotion of reservation priority.

For example, if a workload is running on a system and the system itself is running and appears to be healthy then the reservation(s) on secondary systems that are associated with the workload may be considered effectively a workload with a certain priority (e.g. the priority may be 10 on a scale of 1-10, where 10 is the lowest). As failure indicators accumulate with respect to the system running the critical workload then the reservation is scaled up on the secondary resources.

Importantly, scaling priority of workload reservations may be utilized in conjunction with a priority level assigned to other workloads deployed in the virtual environment. In this manner, the presently disclosed inventive concepts allow utilization of more overall resources because the reserved resources for one workload may be utilized despite the existence of the reservation. For instance, if a priority level associated with a workload deployed subsequent to the original reservation is higher than the priority level associated with that reservation, then the resources may be released for utilization by the subsequent workload. Upon completion of the subsequent workload, the reservation may be reinstated.

Figure 4A:
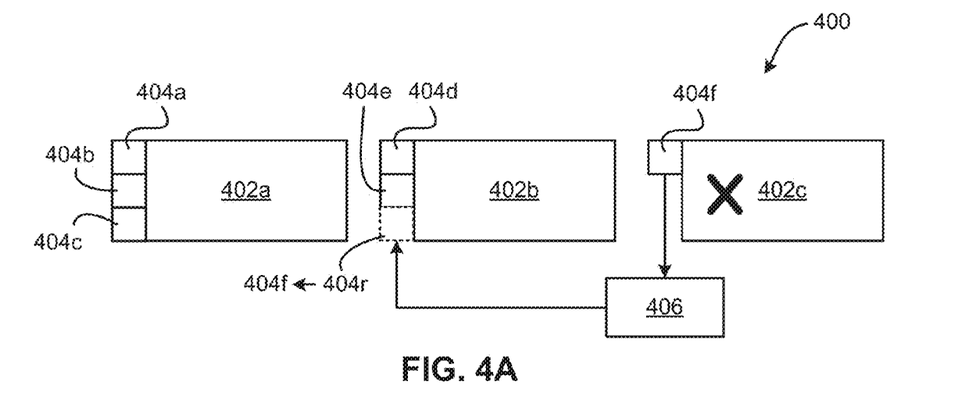
FIGS. 4A-4B depicts a virtualized environment in which failure events may be compensated for via a soft reservation workload distribution strategy, according to one embodiment.
Figure 4B:
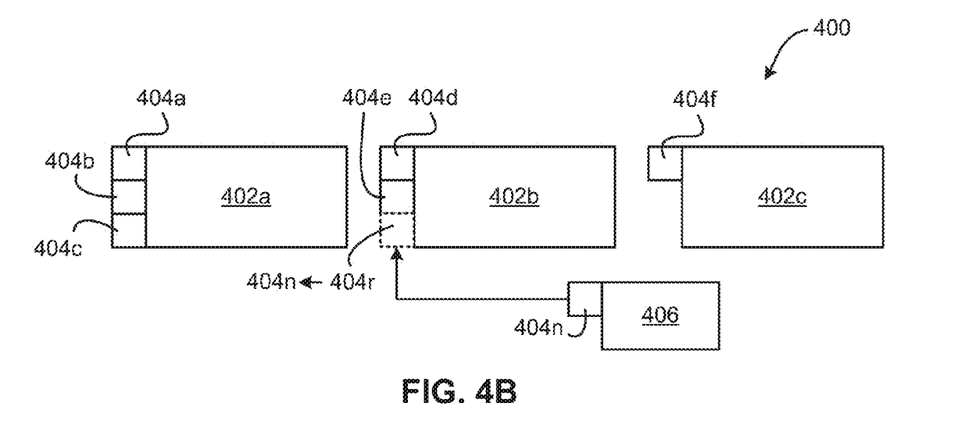

As shown in FIGS. 4A-4B, the above reservation, health characteristic tracking, and prioritization of reservations and/or workloads may be implemented in a virtualized environment 400 including multiple systems 402a-402c each having associate therewith one or more workloads, e.g. workloads 404a-404f. In contrast to the conventional environment 300 depicted in FIG. 3, the virtualized environment 400 includes a workload manager 406 configured to monitor and analyze health characteristics, assign and/or adjust weights associated with various health characteristics and conditions; place soft reservations; release reservations for subsequent workload deployment; reinstate reservations; etc. as would be understood by a person having ordinary skill in the art upon reading the present disclosures.

As noted above, in one approach a reservation may take the form of a "mock" workload, e.g. 404r as shown in FIG. 4A. Upon experiencing a failure on system 402c, a workload 404f previously being handled by the failed system may be migrated to the resources reserved by the reserving "mock" workload 404r on a secondary system 402b. Of course, in other approaches a mock workload may not be implemented, but rather apparent resources may be reduced, or workloads may be refused deployment upon system 402b utilizing resources above a threshold level (e.g. an amount approximately equal to a total amount of resources of system 402b minus an amount of resources required by the workload 404f for which the reservation was made.

As shown in FIG. 4B, in more approaches upon deployment of a new workload 404n to the environment 400, and based on evaluating relative priority of the reserving mock workload 404r associated with workload 404f, and the new workload 404n, the reservation may be released and new workload 404n may be assigned to the resources reserved by reserving mock workload 404r in response to determining the new workload 404n has a priority greater than or equal to the priority of the reservation associated with mock workload 404r. Preferably, the evaluation of relative priority levels is performed at least in part using the workload manager 406.

Of course, as will be appreciated by a person having ordinary skill in the art upon reading the instant disclosures, embodiments represented in FIGS. 4A and 4B may be utilized in conjunction. For instance, according to the scenario described above for FIG. 4B, new workload 404n may be completed, and the reservation mock workload 404r reinstated on secondary system 402b. In event of a failure on system 402c as shown in FIG. 4A, the failing workload 404f may be migrated to the secondary system 402b.

In the illustrative embodiment depicted in FIGS. 4A and 4B, the reservation may not be possible on one or more systems in the environment 400, e.g. system 402a may have deployed thereto workloads 404a-404c sufficient to consume too many resources for reservations for a particular workload 404f to be made.

In the above manner, soft reservation techniques and systems as described herein advantageously provide the ability to maximize utilization of resources across the environment 400 as a whole, while still enabling a reservation-based failover solution to address system failures. The reservation and release process is preferably based on the priority of the workload(s), as well as the priority of the reservation, which reflects the likelihood of the particular workload experiencing a failure event, based on the health characteristics of the system upon which the particular workload is deployed.

In one approach, workload priority may be determined based in whole or in part on a service level agreement associated with the workload. In addition, reservation priority associated with a particular workload may be based at least in part on the SLA for the workload.

Accordingly, the presently disclosed inventive concepts improve the function of virtualized environments by providing a dynamic failover and migration capability while simultaneously increasing the amount of resources available to the system as a whole. Moreover, the dynamic nature of the failover capability may be adjusted in real-time based on changes in system behavior, e.g. failure following particular health conditions or patterns of health conditions.

Furthermore, the presently disclosed inventive concepts improve the functioning of virtualized environments employing failover techniques by avoiding oscillating data center situations. Conventional hard reservation techniques do not take into account system health, but instead definitively reserve resources on a particular system for failover purposes. This may result in a situation where the system upon which resources are reserved is itself likely to experience a failure, in turn causing the workload to "oscillate" between different systems in a sub-optimal manner, as each migration adds overhead to the process of handling the workload. Accordingly, in preferred approaches reservation placement on a particular system is further based at least in part on health characteristics of the system.

In one embodiment, system health value changes may be used to begin migrating workloads on other systems, to ensure enough space is clear for a soft reservation.

In another embodiment, a strategy for determining which system to make a soft reservation on may take into consideration proximity and/or latency associated with the resources required to make the reservation and/or process the workload associated with the soft reservation.

Figure 5:
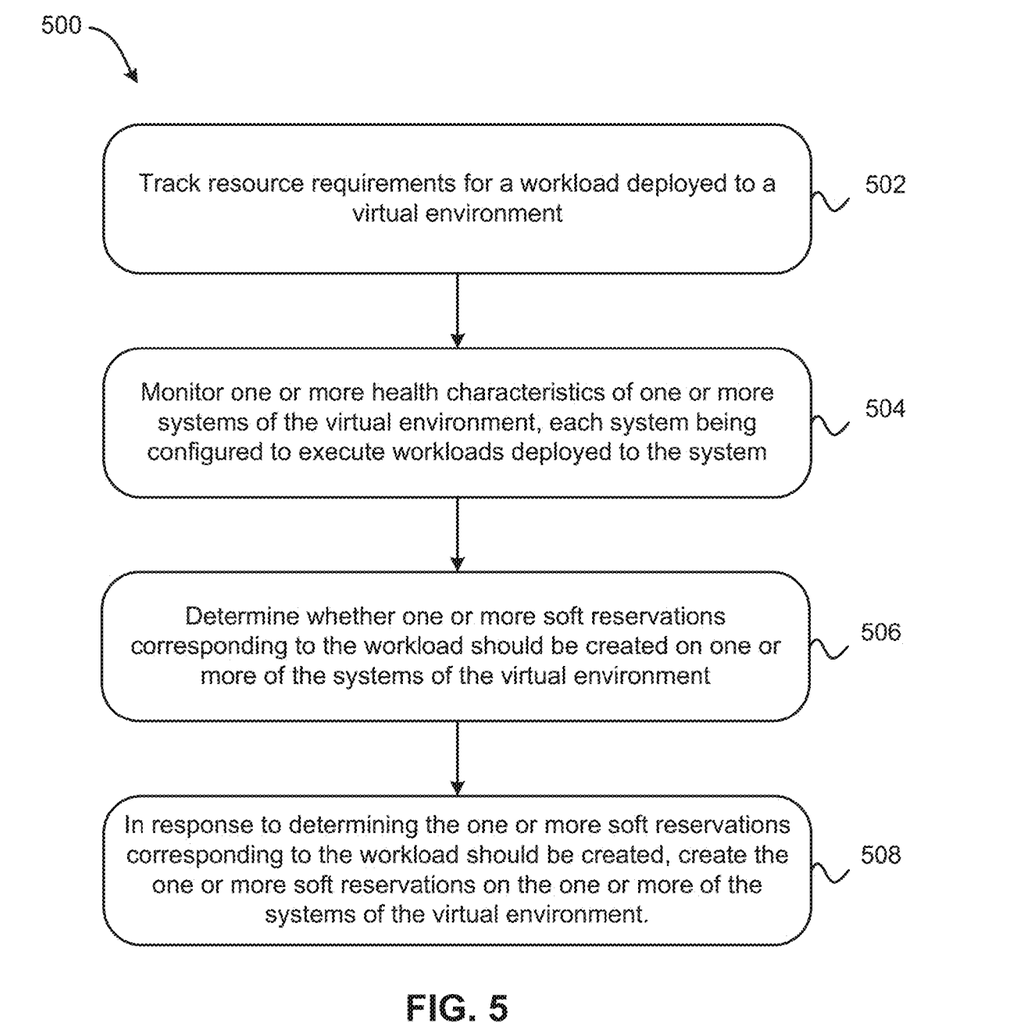
FIG. 5 shows a flowchart of a method, according to one approach.

Now referring to FIG. 5, a flowchart of a method 500 is shown according to one embodiment. The method 500 may be performed in accordance with the present invention in any of the environments depicted in FIGS. 1-2 and 4A-4B, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment.

As shown in FIG. 5, method 500 may initiate with operation 502, where resource requirement(s) associated with a workload deployed to a virtual environment are tracked. Tracking resource requirements may include determining a minimum amount of resources of various types as disclosed herein which are required to effectively execute the workload on one or more secondary systems of the virtual environment, e.g. systems to which the workload was not initially deployed.

Method 500 also includes monitoring one or more health characteristics of one or more systems of the virtual environment in operation 504. Monitoring health characteristics may be performed in any suitable manner and using any suitable sensors, components, or other hardware and/or software as would be understood by a person having ordinary skill in the art upon reading the present disclosures.

In operation 506, method 500 includes determining whether one or more soft reservations corresponding to the deployed workload should be created on one or more, e.g. secondary, systems of the virtual environment. Determining whether to create soft reservation(s) may be based on any suitable technique as described herein, and preferably is based on a plurality of health characteristics, where reservations are more likely to be created as a function of increasing likelihood that the system to which the workload was deployed will experience a failure during execution of the workload.

Method 500 further includes creating the one or more soft reservations on the one or more of the systems of the virtual environment. More particularly, the creation is performed in operation 508 in response to determining the one or more soft reservations corresponding to the workload should be created in operation 506.

Of course, and as would be understood by a person having ordinary skill in the art upon reading the present disclosures, the method 500 may be similarly embodied as a system including a processor and logic integrated with and/or configured to be executed by the processor. In addition, method 500 may be embodied as a computer program product comprising a computer readable medium having stored thereon program instructions configured to perform the method 500.

Further still, the method 500, as well as corresponding systems and computer program products, may include any number of additional and/or alternative features as described herein. For instance, in various embodiments method 500 and/or corresponding systems and computer program products may include any of the following features or functionalities in any suitable combination that would be appreciated by a skilled artisan reading this description.

In one approach, method 500 may include defining a priority of the workload; and defining a priority of each of the one or more soft reservations corresponding to the workload. Preferably, the priority of the workload is defined based at least in part on a service level agreement (SLA) associated with the workload; and the priority of each of the one or more soft reservations corresponding to the workload is defined based at least in part on one or more of the health characteristics monitored for the system to which the workload was deployed for processing.

In another embodiment, method 500 may include promoting the priority of one or more of the soft reservation(s) corresponding to the workload in response to determining one or more of the health characteristics monitored for the system to which the workload was deployed for processing indicates an increased likelihood of failure of the system to which the workload was deployed for processing. Similarly, the method may include demoting the priority of one or more of the soft reservation(s) corresponding to the workload in response to determining one or more of the health characteristics monitored for the system to which the workload was deployed for processing indicates a decreased likelihood of failure of the system to which the workload was deployed for processing.

In various approaches, the one or more health characteristics may include at least one of: a read/write throughput of the system to which the workload was deployed for processing; a read/write failure rate of the system to which the workload was deployed for processing; a latency of the system to which the workload was deployed for processing; an operating status of one or more components of the system to which the workload was deployed for processing (e.g. processor, fan, memory, storage, etc.); a temperature of one or more of the components of the system to which the workload was deployed for processing; a voltage across one or more of the components of the system to which the workload was deployed for processing; a network bandwidth of one or more of the components of the system to which the workload was deployed for processing; a correctable error rate of the system to which the workload was deployed for processing; a result of a predictive failure analysis performed on the system to which the workload was deployed for processing; and a mean time between failure of the system to which the workload was deployed for processing.

In more approaches, method 500 may include assigning a weighted value to each of the monitored health characteristics. Preferably, the weighted value assigned to each of the monitored health characteristics is selected from a predetermined range of values and a different weighted value may be assigned to each of the monitored health characteristics. More preferably, the range is a range from 0-1 (e.g. 0.01, 0.1, 0.25, 0.33, 0.5, 0.75, 0.9, 1.0, etc.) or any equivalent range which may be expressed on a scale from 0-1, with 0 representing the lowest possible weight (i.e. no weight) and 1 representing the highest possible weight (i.e. full weighting). Most preferably, the weighted value assigned to each of the monitored health characteristics is representative of a likelihood of system failure related to the respective health characteristic.

In still more embodiments, the method 500 may involve modifying one or more of the weighted values assigned to one or more of the monitored health characteristics in response to determining the weighted value associated with the monitored health characteristic does not accurately represent the likelihood of system failure related to the respective health characteristic. As noted above, determining the weighted value does not accurately represent the likelihood of system failure may be based on observing historical health characteristics in association with system failures on the system or other systems in the virtualized environment, and enables dynamic adjustment of weights to maximize knowledge of impending likely failure events.

In response to detecting a failure of the system the system to which the workload was deployed, method 500 may include migrating the workload to the system upon which the soft reservation was created.

In more approaches, method 500 may include determining whether to release one or more of the soft reservations created on the one or more of the systems of the virtual environment; releasing at least one of the one or more soft reservations created on the one or more of the systems of the virtual environment; and deploying a new workload to at least one of the systems from which the one or more soft reservations were released.

Determining whether to release one or more of the soft reservations created on the one or more of the systems of the virtual environment is preferably based at least in part on one or more of the monitored health characteristics of at least one of the one or more systems of the virtual environment. Alternatively and/or additionally, determining whether to release one or more of the soft reservations created on the one or more of the systems of the virtual environment may be based at least in part on comparing a priority of the new workload to a priority of the soft reservation.

Moreover, in various approaches creating the one or more soft reservations may include at least one of: deploying a mock workload to one or more of the systems of the virtual environment; reducing an amount of apparent resources available to one or more of the systems of the virtual environment; and setting a threshold amount of usable resources of one or more of the systems of the virtual environment of workload deployment. In the case of setting a threshold amount of usable resources, creating the soft reservations may also involve enforcing the soft reservation by rejecting additional workloads deployed to the one or more of the systems of the virtual environment in response to determining the amount of resources in use by the one or more systems of the virtual environment is within a predefined range of the threshold amount of usable resources.

Determining whether the one or more soft reservations should be created, in at least one embodiment, is preferably based at least in part on one or more of: a utilization level of one or more systems of the virtual environment; a queue for workload execution within the virtual environment; a health level of the system to which the workload was deployed; and a service level agreement (SLA) requirement associated with the workload. The resource requirements may include one or more of: available memory; available processor capacity; available storage space; system latency; system network bandwidth; system read/write throughput; system I/O bandwidth; and system I/O throughput.

The method 500 may also be characterized by each soft reservation effectively reserving an amount of resources of the system on which the soft reservation is created. Preferably, the amount of resources reserved corresponds to the resource requirements for the workload deployed to the virtual environment.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product, comprising: a computer readable medium having stored thereon computer readable program instructions configured to cause a processor of a computer system to:

track resource requirements for a workload deployed to first system of a virtual environment;

monitor a plurality of weighted health characteristics of one or more systems of the virtual environment, wherein each system is configured to execute workloads deployed to the system, wherein the monitored health characteristics are assigned different weights on a normalized scale from zero to one, and wherein each weight is based on a severity of the monitored health characteristic with respect to likelihood of failure of a corresponding one of the one or more systems of the virtual environment within a predefined time frame;

determine whether one or more soft reservations corresponding to the workload should be created on one or more of the systems of the virtual environment based on the monitored health characteristics;

in response to determining the one or more soft reservations corresponding to the workload should be created, create the one or more soft reservations on the one or more of the systems of the virtual environment, wherein the one or more of the systems of the virtual environment on which the one or more soft reservations are created are different systems than the first system;

define a priority of the workload; and define a priority of each of the one or more soft reservations corresponding to the workload; and wherein resources associated with the one or more soft reservations are conditionally available for use by other workloads based on a priority of a mock workload corresponding to the one or more soft reservations relative to a priority of the other workloads; and wherein the one or more systems of the virtual environment on which the soft reservations are created are chosen based at least in part on health characteristics of said one or more systems of the virtual environment on which the soft reservations are created.

2. The computer program product as recited in claim 1, wherein the priority of the workload is defined based at least in part on a service level agreement (SLA) associated with the workload; and wherein the priority of each of the one or more soft reservations corresponding to the workload is defined based at least in part on one or more of the health characteristics monitored for the first system.

3. The computer program product as recited in claim 1, comprising computer readable program instructions configured to cause the processor of the computer system to:

promote a priority of one or more of the soft reservation(s) in response to determining one or more of the monitored health characteristics indicates an increased likelihood of failure of said one or more systems relative to the first system; and in response to determining the one or more of the monitored health characteristics indicates a decreased likelihood of failure of said one or more systems relative to the first system, demote the priority of one or more of the soft reservation(s).

4. The computer program product as recited in claim 1, wherein the monitored health characteristics are each independently selected from the group consisting of:

a read/write throughput of the first system;

a latency of the first system;

a temperature of one or more components of the first system;

a voltage across one or more of the components of the first system;

a correctable error rate of the first system; and a mean time between failure of the first system.

5. The computer program product as recited in claim 1, wherein the weights assigned to the monitored health characteristics are representative of a likelihood of system failure related to the monitored health characteristic;
   wherein the monitored health characteristics comprise one or more high risk characteristics and one or more low risk characteristics;
   wherein the one or more high risk characteristics are each independently selected from the group consisting of: temperature-based measures, voltage-based measures, and read/write failures; and
   wherein the one or more low risk characteristics are each independently selected from the group consisting of: a latency-based measure, an I/O throughput level, and a fan speed deviation.

6. The computer program product as recited in claim 1, comprising computer readable program instructions configured to cause the processor of the computer system to: modify one or more weights assigned to one or more of the monitored health characteristics in response to determining the one or more weights do not accurately represent a likelihood of system failure related to the respective one or more monitored health characteristics.

7. The computer program product as recited in claim 1, wherein tracking the resource requirements for the workload comprises determining a minimum amount of resources required to execute the workload on one or more secondary systems of the virtual environment.

8. The computer program product as recited in claim 1, comprising computer readable program instructions configured to cause the processor of the computer system to:
   determine whether to release one or more of the soft reservations created on the one or more of the systems of the virtual environment;
   release at least one of the one or more soft reservations created on the one or more of the systems of the virtual environment; and
   deploy a new workload to at least one of the systems from which the one or more soft reservations were released.

9. The computer program product as recited in claim 8, wherein determining whether to release one or more of the soft reservations created on the one or more of the systems of the virtual environment is based at least in part on one or more of the monitored health characteristics of at least one of the one or more systems of the virtual environment other than the first system.

10. The computer program product as recited in claim 8, wherein determining whether to release one or more of the soft reservations created on the one or more of the systems of the virtual environment is based at least in part on comparing a priority of the new workload to a priority of the soft reservation.

11. The computer program product as recited in claim 1, wherein the monitored health characteristics comprise one or more potential failure indicators selected from the group consisting of: correctable error indicators and mean time between failure statistics.

12. The computer program product as recited in claim 1, wherein determining whether the one or more soft reservations should be created is based on:
   a utilization level of one or more systems of the virtual environment;
   a queue for workload execution within the virtual environment;
   a health level of the system to which the workload was deployed; and
   a service level agreement (SLA) requirement associated with the workload.

13. The computer program product as recited in claim 1, wherein the resource requirements comprise one or more of:
   system latency; and
   system I/O bandwidth.

14. The computer program product as recited in claim 1, wherein each soft reservation effectively reserves an amount of resources of the system on which the soft reservation is created;
   wherein the amount of resources reserved corresponds to the resource requirements for the workload deployed to the virtual environment; and
   wherein, during the reservation, the amount of resources reserved are available for use by other workloads having a priority level higher than a priority level of the workload for which the soft reservation was created.

15. A computer-implemented method, comprising
   tracking resource requirements for a workload deployed to first system of a virtual environment;
   monitoring a plurality of weighted health characteristics of one or more systems of the virtual environment, wherein each system is configured to execute workloads deployed to the system, wherein the monitored health characteristics are assigned different weights on a normalized scale from zero to one, and wherein each weight is based on a severity of the health characteristic with respect to likelihood of failure of a corresponding one of the one or more systems of the virtual environment within a predefined time frame;
   determining whether one or more soft reservations corresponding to the workload should be created on one or more of the systems of the virtual environment based on the monitored health characteristics;
   in response to determining the one or more soft reservations corresponding to the workload should be created, creating the one or more soft reservations on the one or more of the systems of the virtual environment, wherein the one or more of the systems of the virtual environment on which the one or more soft reservations are created are different systems than the first system;
   defining a priority of the workload; and
   defining a priority of each of the one or more soft reservations corresponding to the workload; and
   wherein resources associated with the one or more soft reservations are conditionally available for use by other workloads based on a priority of a mock workload corresponding to the one or more soft reservations relative to a priority of the other workloads; and
   wherein the one or more systems of the virtual environment on which the soft reservations are created are chosen based at least in part on health characteristics of said one or more systems of the virtual environment on which the soft reservations are created.

16. The method as recited in claim 15,
   wherein the priority of the workload is defined based at least in part on a service level agreement (SLA) associated with the workload.

17. A system, comprising a processor and logic, the logic being integrated with and/or executable by the processor to cause the processor to:
   track resource requirements for a workload deployed to first system of a virtual environment;
   monitor a plurality of weighted health characteristics of one or more systems of the virtual environment, wherein each system is configured to execute workloads deployed to the system, wherein the monitored health characteristics are assigned different weights on a normalized scale from zero to one, and wherein each weight is based on a severity of the monitored health characteristic with respect to likelihood of failure of a corresponding one of the one or more systems of the virtual environment within a predefined time frame;

determine whether one or more soft reservations corresponding to the workload should be created on one or more of the systems of the virtual environment based on the monitored health characteristics;

in response to determining the one or more soft reservations corresponding to the workload should be created, create the one or more soft reservations on the one or more of the systems of the virtual environment, wherein the one or more of the systems of the virtual environment on which the one or more soft reservations are created are different systems than the first system;

define a priority of the workload; and define a priority of each of the one or more soft reservations corresponding to the workload; and wherein resources associated with the one or more soft reservations are conditionally available for use by other workloads based on a priority of a mock workload corresponding to the one or more soft reservations relative to a priority of the other workloads; and wherein the one or more systems of the virtual environment on which the soft reservations are created are chosen based at least in part on health characteristics of said one or more systems of the virtual environment on which the soft reservations are created.

18. The computer program product as recited in claim 1, comprising computer readable program instructions configured to cause the processor of the computer system to:

promote a priority of one or more of the soft reservation(s) in response to determining one or more of the monitored health characteristics indicates an increased likelihood of failure of said one or more systems relative to the first system;

demote the priority of one or more of the soft reservation(s) in response to determining the one or more of the monitored health characteristics indicates a decreased likelihood of failure of said one or more systems relative to the first system;

modify one or more of the weights assigned to one or more of the monitored health characteristics in response to determining the one or more weights do not accurately represent a likelihood of system failure related to the one or more monitored health characteristics;

determine whether to release one or more of the soft reservations created on the one or more of the systems of the virtual environment, wherein determining whether to release one or more of the soft reservations is based at least in part on:

a utilization level of one or more systems of the virtual environment;

a queue for workload execution within the virtual environment;

a health level of the system to which the workload was deployed;

a service level agreement (SLA) requirement associated with the workload; and a priority of a new workload relative to a priority of the soft reservation; and release at least one of the one or more soft reservations created on the one or more of the systems of the virtual environment;

deploy the new workload to at least one of the systems from which the one or more soft reservations were released;

wherein the priority of each of the one or more soft reservations corresponding to the workload is defined based at least in part on one or more of the monitored health characteristics being monitored for the system to which the workload was deployed for processing;

wherein the weight to each of the monitored health characteristics is representative of a likelihood of system failure related to the respective health characteristic;

wherein the monitored health characteristics comprise one or more high risk characteristics selected from the group consisting of:

a read/write throughput of the first system to which the workload was deployed for processing;

a temperature of one or more components of the first system;

a voltage across one or more of the components of the first system;

wherein the monitored health characteristics further comprise one or more characteristics selected from the group consisting of:

a latency of the first system;

an operating status of one or more components of the first system;

a correctable error rate of the first system; and a mean time between failure of the first system; and wherein the predefined time frame is 24 hours;

wherein tracking the resource requirements for the workload comprises determining a minimum amount of resources required to execute the workload on one or more secondary systems of the virtual environment; and wherein the resource requirements comprise:

system latency;

system read/write throughput;

system I/O bandwidth; and system I/O throughput.

* * * * *